C. VOTTI,

Assignor to B. B. SCHNEIDER.

SHADE-HOLDERS FOR LAMPS.

No. 7,511. Reissued Feb. 13, 1877.

Witnesses:

P. C. Dieterich.

Frank H. Duffy

Inventor:

Carl Votti

Per: C. H. Watson & Co Attorneys.

N. PETERS, Photo-Lithographer, Washington, D. C.

UNITED STATES PATENT OFFICE.

CARL VOTTI, OF NEWARK, NEW JERSEY, ASSIGNOR TO BENNETT B. SCHNEIDER, OF NEW YORK CITY.

IMPROVEMENT IN SHADE-HOLDERS FOR LAMPS.

Specification forming part of Letters Patent No. 182,973, dated October 3, 1876; reissue No. 7,511, dated February 13, 1877; application filed January 27, 1877.

*To all whom it may concern:*

Be it known that I, CARL VOTTI, of Newark, in the county of Essex and State of New Jersey, have invented certain new and useful Improvements in Shade-Holder for Lamps; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention relates to lamps; and it consists in a transparent shade-holder, or holder of a material allowing the passage of light, and shade or globe so arranged that an ordinary lamp-burner can be used without a chimney, as will be hereinafter more fully set forth.

Figure 1:
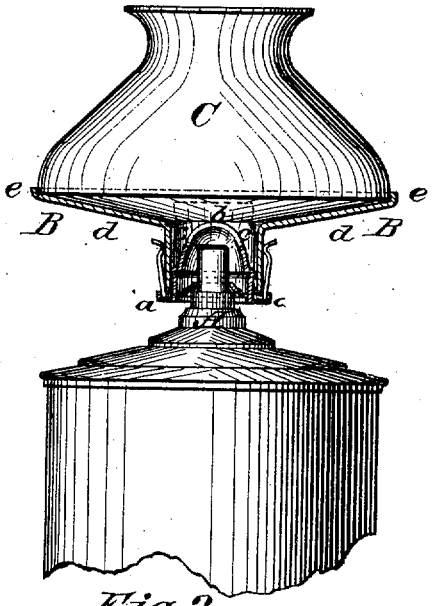
Figure 2:
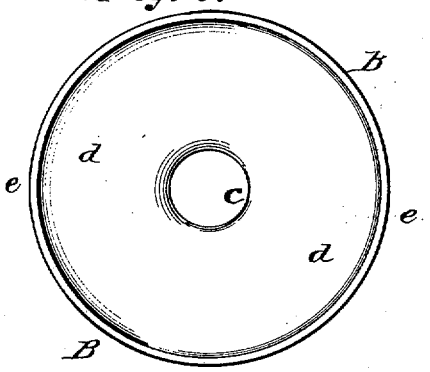

In the annexed drawing, Figure 1 is a vertical section of my invention. Fig. 2 is a plan view of the shade-holder.

A represents an ordinary lamp-burner, provided with a circumferential flange, *a*, for the support of the cone *b*, and which, ordinarily, also serves to support the chimney or cylinder. This flange is provided with suitable perforations, through which air is admitted both inside and outside of the cone.

Instead of using the flange *a* for the support of the ordinary chimney, I place on the same my shade-holder B, which is made of glass or other suitable transparent material, or material that will allow of the passage of light, and which is provided with a tubular extension or socket, *c*, that fits over the cone *b*, leaving an air-space between its inner surface and the outer surface of said cone. From said socket extends a broad dish-shaped flange, *d*, which is provided with a rim, *e*, and which serves to support and retain the shade C. The flange *d* is perfectly closed, so that no air will pass to the flame except what is admitted through the perforations in the burner-flange *a*, and by these means I am enabled to produce a bright flame without the use of an ordinary chimney or cylinder. The advantages of this arrangement will be apparent, since it allows of keeping the burner clean, and of trimming the wick without difficulty, and the annoyance of broken chimneys is avoided.

It will be seen that with the shade-holder and shade arranged, as shown and described, the ordinary burner will perform the required functions without the use of a chimney.

I am well aware that transparent shade-holders are of themselves not new; hence I do not claim such, broadly, as being my invention.

Having thus fully described my invention, what I claim as new, and desire to secure by Letters Patent, is—

1. In a lamp having a burner, the combination of a shade-holder made of material that will admit of the passage of light, and a shade or globe, arranged and constructed substantially as described, whereby the burner performs the required functions without the use of a chimney, as set forth.

2. The shade holder B, constructed of material that will admit of the passage of light, and provided with a downwardly-extending socket, *c*, and dish-shaped flange *d*, with rim *e*, in combination with a globe or shade, C, and burner A of a lamp, as and for the purposes herein set forth.

3. The combination, in a lamp, of the burner A, having perforated flange *a* and cone *b*, the shade-holder B, with central socket *c*, and a shade or globe, C, substantially as and for the purposes herein set forth.

In testimony that I claim the foregoing, I have hereunto set my hand.

CARL VOTTI.

Witnesses:

HENRY ARENS,

E. F. KASTENHUBER.